United States Patent [19]

Flanagan, III

[11] Patent Number: 4,520,830

[45] Date of Patent: Jun. 4, 1985

[54] ULTRASONIC IMAGING DEVICE

[75] Inventor: Eugene L. Flanagan, III, Manhasset, N.Y.

[73] Assignee: American Home Products Corporation (Del.), New York, N.Y.

[21] Appl. No.: 566,058

[22] Filed: Dec. 27, 1983

[51] Int. Cl.³ .............................................. A61B 10/00
[52] U.S. Cl. ...................................... 128/660; 73/631
[58] Field of Search .............................. 128/660–661; 73/631

[56] References Cited

U.S. PATENT DOCUMENTS

| 4,016,862 | 4/1977 | Lancee et al. | 73/900 X |
| 4,140,107 | 2/1979 | Lancee et al. | 73/900 X |
| 4,205,555 | 6/1980 | Hashiguchi | 73/631 X |
| 4,432,236 | 2/1984 | Nagasaki | 73/631 |

Primary Examiner—Edward M. Coven
Assistant Examiner—Francis J. Jaworski
Attorney, Agent, or Firm—Edward M. Blocker

[57] ABSTRACT

For medical examination purposes, an ultrasonic imaging device in which ultrasonic pulses are transmitted into a body of a patient and reflected therefrom. The reflected pulses are converted from ultrasonic to electrical signals by electro-acoustic elements which are then amplified by a time-gain-controlled device and converted for display on a CRT by a scan converter. Amplification of the time-gain-controlled device is controlled by an output voltage produced by a control voltage generator. The generator includes circuitry for automatically delaying the amplitude varying characteristics of the output voltage with time.

26 Claims, 5 Drawing Figures

ULTRASONIC IMAGING DEVICE

BACKGROUND OF THE INVENTION

1. Field of the Invention

The present invention relates to ultrasonic diagnostic apparatus in which ultrasonic pulses are radiated toward and reflected from objects within a living body and more particularly is directed toward compensating for attenuation of such ultrasonic pulses due to absorption and scattering of the latter by these objects.

2. Description of the Prior Art

For purposes of medical diagnosis, a beam of ultrasonic waves of short duration, that is, ultrasonic pulses produced by an ultrasonic source such as one or more electroacoustic transducers are directed toward and focussed at a fetus, a particular internal organ, or other object within a patient under examination. As the pulse travels through the patient, portions of each pulse are reflected back toward one or more receiving elements, such as the ultrasonic source, as the acoustic impedance along the path of the pulse changes. Variations in the acoustic impedance, which is defined as the product of the density of the object through which the pulse travels and the speed of the ultrasound pulse, occur at tissue interfaces. These reflections are converted by the one or more receiving elements into electrical signals, referred to as echo signals, which are amplified and further processed and then displayed on a screen, such as a cathode ray tube.

The strength, that is, amplitude of the echo signals depends on the length and path traveled by the ultrasonic pulses. More particularly, as the beam travels toward and is reflected from an object of interest, portions of the beam are absorbed and/or scattered by the object of interest and/or other objects along the path of the beam. Consequently, the amplitude of the echo signals is reduced resulting in a distored image produced on the screen.

The strength of the echo signals, however, can be compensated and thereby corrected for by providing a variable gain amplifier whose gain changes with time. For controlling the gain of the amplifier, a control voltage generator such as disclosed in U.S. Pat. Nos. 4,016,862; 4,140,107 and 4,205,555 provides integrating means which produce a control voltage in the form of a ramp supplied to the amplifier in order to vary the gain with time. Initiation of the ramp voltage in U.S. Pat. Nos. 4,016,862 and 4,140,107, is triggered at the moment the beam is radiated from an ultrasonic source. Consequently, the gain of the amplifier is continuously increased beginning at the moment the beam is radiated from the ultrasonic source.

The ulrasonic source in all of these patents is designed so as to rest on the skin surface of the patient. Accordingly, the beam initially travels through the skin surface and does not immediately come into contact with objects which would significantly absorb or scatter the beam. Therefore, increasing the gain of the amplifier at the moment the beam is radiated from the ultrasonic source, as in U.S. Pat. Nos. 4,016,862 and 4,140,107, is unnecessary and undesirable. In fact, applying a ramp voltage to the amplifier before the echo signal has been significantly attenuated overcompensates for such attenuation and provides an echo signal with too high an amplitude, thereby distorting the image produced on the screen.

In U.S. Pat. No. 4,205,555, operation of the integrating means is inhibited by delay circuitry so that a ramp voltage can be supplied to the amplifier only after an acceptable period of time has elapsed from transmission of the beam. The delay circuitry, however, is dependent upon receiving a pulse from a pulse generating means for purposes of triggering operation of the delay circuitry. In other words, U.S. Pat. No. 4,205,555 discloses an undesirable nonautomatic rather than a desirable automatic means of delaying the time varying characteristics of the control voltage supplied to the amplifier.

OBJECTS AND SUMMARY OF THE INVENTION

Accordingly, it is an object of the present invention to provide an ultrasonic imaging device which avoids the above-mentioned drawbacks.

More specifically, it is an object of the present invention to provide means for automatically delaying variation of the gain with time of a variable gain amplifier of an ultrasound imaging device.

It is another object of the present invention to provide a control voltage generator for controlling the gain of a variable gain amplifier of an ultrasonic imaging device whose ramp-like characteristic is delayed for a predetermined period of time.

In accordance with an aspect of this invention for examining the interior of an object, an ultrasonic imaging device includes means for producing echo signals representative of the paths traveled within said object by corresponding ultrasonic waves, amplifying means for amplifying said echo signals and control means for controlling the level of amplification provided by said amplifying means; said control means comprising means for producing a plurality of input signals, first adjustable voltage means having a plurality of voltages, integrating means for operating on said input signals and producing integrated signal levels of a particular polarity, inverting means for reversing the polarity of said integrated signal levels and producing inverted signal levels, and summing means for adding said plurality of voltages and said integrated signal levels and producing control signals in accordance with said inverted signal levels; said amplifying means amplifying said echo signals in response to said control signals.

In a feature of the present invention, the summing means further adds said inverted signal levels in producing said control signals.

In yet another feature of the present invention, said integrating means produce a present integrated signal level based upon a last, previous inverted signal level.

The above, and other objects, features and advantages of this invention will become apparent from the following detailed description which is to be read in conjunction with the accompanying drawings wherein like reference numerals refer to the same elements.

DETAILED DESCRIPTION OF CERTAIN PREFERRED EMBODIMENTS

Figure 1:
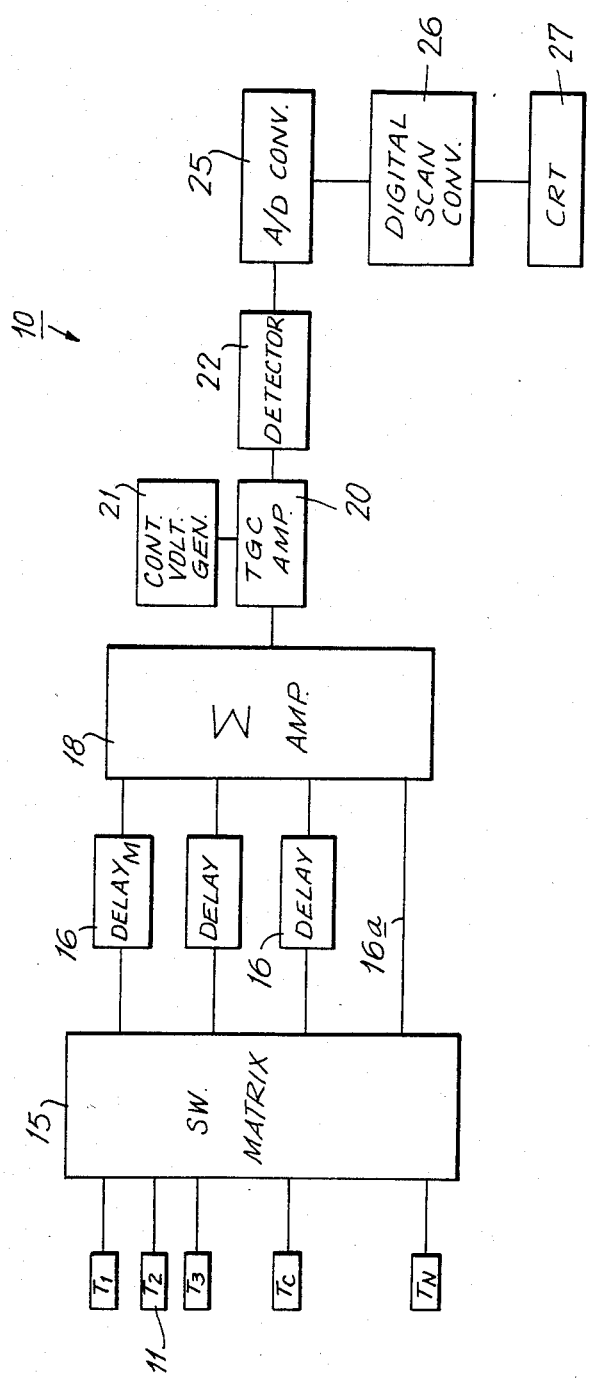
FIG. 1 is a block diagram of an ultrasonic imaging device in accordance with the present invention.

As shown in FIG. 1, a block diagram of an ultrasonic imaging device 10 comprises a plurality of electroacoustic transducers 11 ($T_1$–$T_N$), a switching matrix 15, delay circuits 16, a summing amplifier 18, a time-gain-control amplifier 20, a control voltage generator 21, an envelope detector 22, an analog to digital converter 25, a digital scan converter 26 and a cathode ray tube (CRT) 27.

For producing each acoustic line of information, each transducer 11 transmits at least one ultrasonic wave, in the form of a pulse, focussed at an object within a patient under examination. Portions of each pulse are reflected back toward one of the transducers 11 as the acoustic impedance along the path of the pulse changes. The acoustic impedance, as previously noted, is the product of the density of the object through which the pulse travels and the speed of the ultrasound pulse. The reflected pulses ($P_1$–$P_N$) are converted by transducers 11 into analog electrical signals, hereinafter referred to as echo signals. The echo signals are combined and therefore reduced in number from N to M, where M is less than N, by switching matrix 15. Inasmuch as each of the reflected pulses travels different distances in order to reach the transducer from which the same was transmitted, the times at which the plurality of pulses $P_1$–$P_N$ are received by the corresponding transducers $T_1$–$T_N$, and produced as echo signals, varies. Consequently, delay circuits 16 are provided so that the M combined echo signals supplied by switching matrix 15 are synchronized with each other, that is, so that all reflected pulses appear to reach their respective transducers at the same time. In this regard, each of the delay circuits 16 delays particular echo signals by different time intervals except for those echo signals representing the reflected pulses which have traveled the longest distances to reach their corresponding transducers as indicated by line 16a. Summing amplifier 18 adds the signals produced by delay circuits 16 and line 16a and supplies the same to time-gain-control (TGC) amplifier 20.

In an alternative embodiment, only one transducer can be used rather than a plurality of transducers. Accordingly neither the switching matrix 15, delay circuitry 16, nor summing amplifier 18 are required.

As mentioned heretofore, the amplitudes of the echo signals depend on the length and objects in the paths traveled by the ultrasonic pulses. In particular, portions of the beam prior to, during, and after reflection by an object under examination are absorbed and/or scattered. Therefore, the amplitudes of the echo signals are reduced resulting in a distorted image produced on CRT 27. In order to compensate for this reduction in amplitude, amplifier 20 has a gain which varies with time. Additionally, control voltage generator 21 supplies a control voltage to amplifier 20 for controlling the gain of the latter, as will be discussed in detail below. Envelope detector 22 receives the output signals from amplifier 20 and filters out the radio frequency (r.f.) carrier. The envelope of acoustic information produced by detector 22 is supplied to analog-to-digital converter 25 which produces a digital representation of the envelope which is then supplied to digital scan converter 26. Converter 26 converts the acoustic coordinates of information into coordinates acceptable for display on CRT 27. Finally, the converted acoustic information is supplied to CRT 27.

Figure 2:
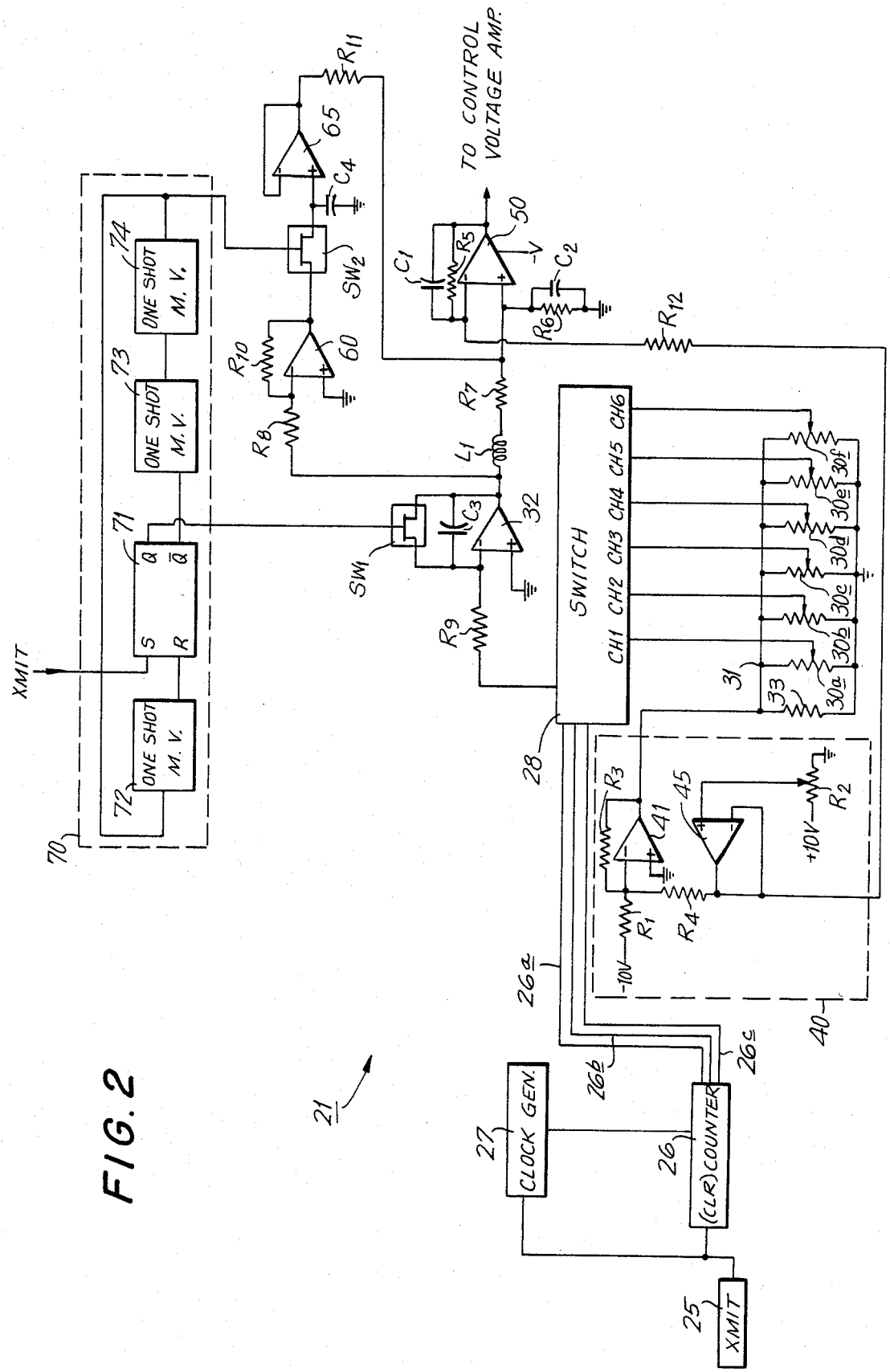
FIG. 2 is a schematic diagram, partially in block form, of a control voltage generator shown in FIG. 1 in accordance with an embodiment of the present invention.

Referring now to FIG. 2, a schematic diagram, partially in block form, of control voltage generator 21 is shown in which a transmitter (XMIT) 25 is connected to a clear (CLR) input of a counter 26, to an enabling input of a clock generator 27, and to the set(S) input of a flip-flop 71. Clock generator 27 is connected to counter 26 for supplying a clock signal representative of the time which has elapsed from transmission of an ultrasonic pulse by one of the transducers 11. Counter 26, which is a binary counter, has three output lines 26a, 26b and 26c connected to a switch 28. Switch 28 has six (6) channels (CH1–CH6) for connection of one of six (6) variable voltage sources, 30a, 30b, 30c, 30d, 30e, or 30f through a resistor $R_9$ to an inverting input of an operational amplifier 32 which operates as an integrator. Each variable voltage source is a variable resistor with its adjustable leg connected to one of the channels of switch 28. One fixed leg of each variable resistor is connected to a node 31 and the other fixed leg of each variable resistor is connected to ground such that the variable resistors form a parallel network. Across node 31 and ground is an additional resistor 33.

A second variable voltage source 40, shown within dashed lines, includes two d.c. voltage sources of equal but opposite polarity. For illustrative purposes only, the d.c. voltage sources are shown as −10 volts and +10 volts and are connected to one end of resistor $R_1$ and one end of variable resistor $R_2$, respectively. The other ends of resistor $R_1$ and variable resistor $R_2$ are connected to an inverting input of a summing amplifier 41 and to ground, respectively. A feedback resistor $R_3$ is connected between the output terminal and the inverting input terminal of summing amplifier 41 and is equal in resistance to that of $R_1$ such that summing amplifier 41 has a unity gain. A noninverting input terminal of summing amplifier 41 is connected to ground. The output terminal of summing amplifier 41 is also connected to node 31 of the parallel network. An adjustable leg of variable resistor $R_2$ is connected to a noninverting input terminal of a buffer amplifier 45. The output terminal of buffer amplifier 45 is connected directly to an inverting input thereof and to one end of a resistor $R_4$. The other end of $R_4$ is connected to the inverting input of summing amplifier 41. Resistor $R_4$ is equal in resistance to that of resistor $R_1$.

Connected to the output of buffer amplifier 45 through a resistor $R_{12}$ is an inverting input terminal of an operational amplifier 50, which operates as a summing means, and one end of a resistor $R_5$ and a capacitor $C_1$. The other ends of resistor $R_5$ and capacitor $C_1$ are connected to the output terminal of summing amplifier 50 and form a feedback loop for amplifier 50. Amplifier 50 is supplied with a −V d.c. voltage for supply of power. Connected to a noninverting input terminal of summing amplifier 50 is the parallel combination of a resistor $R_6$ and a capacitor $C_2$ and one end of a resistor $R_7$. The other end of resistor $R_7$ is connected to a first end of an inductor $L_1$. Inductor $L_1$ is connected at its other end to the output terminal of integrator 32, to one end of a capacitor $C_3$, to one end of a switch $SW_1$, and to an inverting input terminal of an operational amplifier 60 through a resistor $R_8$. Capacitor $C_3$, which serves as a feedback loop for integrator 32, is connected at its other end to an inverting input terminal of integrator 32 and to the other end of switch $SW_1$. Switch $SW_1$ is a field effect transistor (FET). A resistor $R_9$ is connected at one end to the inverting input of integrator 32 and at its other end to an output terminal of switch 28. A noninverting input terminal of integrator 32 is connected to ground.

A feedback resistor $R_{10}$ is connected between the inverting input and output terminals of inverter 60. A noninverting input terminal of inverter 60 is connected to ground. Also connected to the output terminal of inverter 60 is one end of a switch $SW_2$. The other end of $SW_2$ is connected to one end of a capacitor $C_4$ and to a noninverting input terminal of a buffer amplifier 65. The other end of capacitor $C_4$ is grounded. $SW_2$ is a field effect transistor (FET). An output terminal of buffer amplifier 65 is connected directly to an inverting input terminal thereof and to the noninverting input terminal of summing amplifier 50 through a resistor $R_{11}$.

A logic circuit 70, as shown within a second set of dashed lines, comprises three (3) one-shot multivibrators 72, 73 and 74 and flip-flop 71. More specifically, the reset (R) terminal of flip-flop 71 is connected to the output of one-shot multivibrator 72. The Q output terminal of flip-flop 71 is connected to switch $SW_1$ at the gate of the FET for switching the latter from either a conductive to a nonconductive state or from a nonconductive to a conductive state. The $\overline{Q}$ output terminal is connected to the input terminal of one-shot multivibrator 73. One-shot multivibrator 74 is connected at its input terminal to the output terminal of one-shot multivibrator 73 and at its output terminal to the gate of the FET comprising switch $SW_2$ and to the input terminal of one-shot multivibrator 72.

Operation of control voltage generator 21 is as follows: Transmitter (XMIT) 25, which is included within converter 26, produces an enabling signal having a high state simultaneously with the transmission of the first ultrasonic pulse by one of the transducers 11. The high state of the enabling signal enables clock generator 27 to generate clock pulses every 26 microseconds which represent the typical time required for an ultrasonic pulse to travel a depth of two (2) centimeters into the body of a patient and travel the same two (2) centimeters back, that is, to complete a two (2) centimeter round trip. Thus each additional clock pulse of clock generator 27 represents the additional time required by an ultrasound pulse to complete a round trip of an additional two (2) centimeters into the body of a patient under examination. Each clock pulse supplied by clock generator 27 to binary counter 26 increments the value of the count by one. A binary signal representative of the value of the count is supplied to switch 28 such that when the count is one (1), channel one (CH1) is selected by switch 28. Accordingly, variable resistor 30a is connected to resistor $R_9$ as a portion of the first transmitted ultrasonic pulse completes a round trip of two centimeters into the body of a patient and back to one of the transducers 11. When the value of the count is two (2), switch 28 selects channel two (CH2) such that variable resistor 30b is connected to resistor $R_9$ for an additional 26 microseconds. Furthermore, for each additional increment in the value of the count by one, switch 28 connects resistor $R_9$ to variable resistors 30c, 30d, 30e and then 30f spanning four additional 26 microsecond intervals. When the count is zero, that is, when the counter is cleared, as will be discussed below, switch 28 selects none of the six channels.

Variable voltage source 40 varies between supplying zero (0) to ten (10) volts across resistor 33 which results in a voltage supplied to integrator 32 by the variable voltage sources 30a–30f ranging between zero (0) to about three (3) volts. Additionally, variable voltage source 40 supplies a d-c voltage ranging between zero (0) to ten (10) volts to the inverting input terminal of summing amplifier 50. The voltage gain for the inverting input of amplifier 50 is about one-half ($\frac{1}{2}$). Accordingly, the output voltage of amplifier 50, due to source 40, ranges between 0 and $-5$ volts (referred to hereinafter as the near gain voltage). More particularly, when variable resistor $R_2$ is adjusted so that the full $+10$ volts is applied across the noninverting input terminal of buffer amplifier 45, the output voltage of buffer amplifier will be $+10$ volts which is amplified by a gain of $\frac{1}{2}$ and inverted by amplifier 50 to produce a $-5$ volts at the output thereof. Furthermore, since the resistances of $R_1$ and $R_4$ are equal, $+10$ volts at the output of buffer amplifier 45 and a $-10$ volts at one end of resistor $R_1$ results in zero (0) volts at the inverting input terminal of summing amplifier 41. Thus for a near gain voltage of $-5$ volts, the output voltage of amplifier 41 is zero (0). Accordingly, the variable voltage sources 30a–30f are all at zero (0) volts as is the integrator output voltage which is supplied to the noninverting input terminal of amplifier 50. Thus the output voltage of amplifier 50, referred to as the control voltage, is equal to the near gain voltage of $-5$ volts. If, however, variable resistor $R_2$ is adjusted so that zero (0) volts are applied to the noninverting input of buffer amplifier 45, the output voltage of amplifier 45 would be zero (0) volts resulting in a near gain voltage of zero (0) and a $-10$ volts applied to the inverting input of amplifier 41. Since amplifier 41 has unity gain, the output voltage thereof is $+10$ volts which is applied across resistor 33 and therefore across variable resistors 30a–30f. Assuming variable resistors 30a–30f are adjusted so as to provide a maximum voltage to integrator 32, the voltage supplied to the noninverting input of summing amplifier 50 will be $-5$ volts. Still further, when variable resistor $R_2$ is neither at its minimum or maximum setting, the sum of the near gain voltage and voltage applied to the noninverting input of summing amplifier 50 is always between 0 to $-5$ volts. Thus the control voltage produced by amplifier 50 for controlling the gain of time gain controlled amplifier 20 is never greater in absolute value than 5 volts.

The output signal of integrator 32 is in the form of a ramp voltage which is supplied to both inverter 60 through resistor $R_8$ and to summing amplifier 50 through inductor $L_1$ and resistor $R_7$ which serve to filter the ramp voltage for purposes discussed below.

The enabling signal from transmitter 25 is also supplied to the set(S) input of flip-flop 71. Consequently, when the enabling signal changes from a low state to a high state the Q output terminal flips from a low level to a high level which will open switch $SW_1$ and thereby permit an integrated output signal to be produced by integrator 32. As the Q output goes from a low level to a high level, the $\overline{Q}$ output flops from a high level to a low level which triggers one-shot multivibrator 73. The square wave output from multivibrator 73 lasts a time period of $T_1$. At the end of this time period, the trailing edge of the square wave from multivibrator 73 triggers one-shot multivibrator 74. The square wave output of multivibrator opens switch $SW_2$. Multivibrator 74 is chosen so as to time-out as the enabling signal switches from a high state to a low state. Additionally, as multivibrator 74 times out, which thereby closes switch $SW_2$, the trailing edge of the square wave signal from multivibrator 74 triggers one shot multivibrator 72 whose pulse like output signal resets flip-flop 71. Consequently, the Q output terminal flips from a high level to a low level which switches $SW_2$ from a nonconductive to a conductive state such that capacitor $C_3$ is now shorted. Therefore, the output signal of integrator 32, which is in the form of a ramp, drops to a zero (0) voltage level. At the same time, the $\bar{Q}$ output flops from a low level to a high level requiring only a new high state enabling pulse to repeat the above sequence of events.

In the presence of a low state enabling signal, clock generator 27 is disabled and counter 26 is cleared. Thus the sequential selection by switch 28 of channels CH1-CH6 beginning with channel CH1 can be repeated upon the enabling signal assuming a high state once again.

Figure 4A:
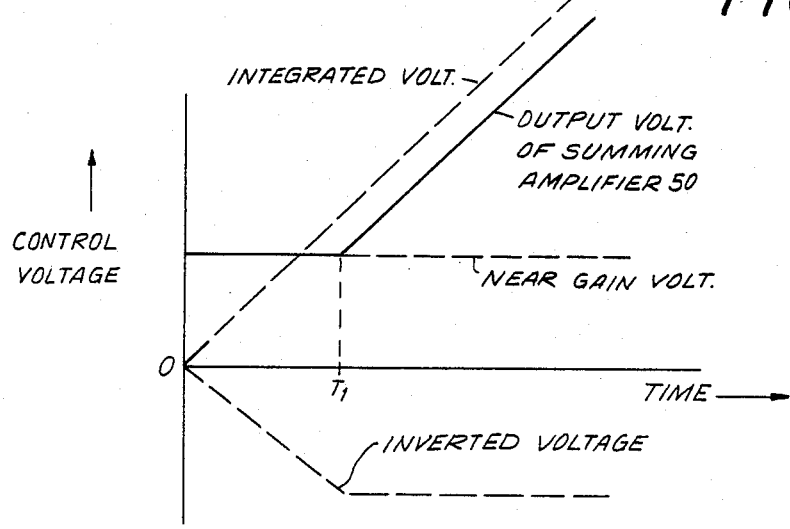
FIGS 4A and 4B graphically illustrate the control voltage produced by the voltage control generators shown in FIGS. 2 and 3, respectively.

Referring now to both FIGS. 2 and 4A, during the period that switch $SW_2$ is closed, that is, for the period $T_1$, the ramp-like output voltage of integrator 32 and the inverted ramp-like output voltage produced by inverter 60 are supplied to summing amplifier 50 as well as the d.c. voltage produced by variable voltage source 40. Inasmuch as the inverted ramp-like output voltage of inverter 60 is equal but of opposite polarity to the output voltage of integrator 32, the signals produced by integrator 32 and inverter 60 cancel each other at the noninverting input of summing amplifier 50. Thus the control voltage produced by summing amplifier 50 will be equal to the near gain voltage. However, at the end of period $T_1$, switch $SW_2$ opens such that capacitor $C_4$ samples and holds the output voltage produced by inverter 60 at time $T_1$. Consequently, a constant d-c voltage rather than an inverted ramp-like voltage is supplied through resistor $R_{11}$ to the summing amplifier 50 thereafter. Therefore, beginning at time $T_1$, the integrator voltage begins to exceed the voltage stored by capacitor $C_4$ such that the control voltage produced by summing amplifier 50 is ramp-like. That is, at time $T_1$ the gain of time-gain-controlled amplifier 20 begins to rise with time so as to compensate for the attenuated echo signals.

Figure 3:
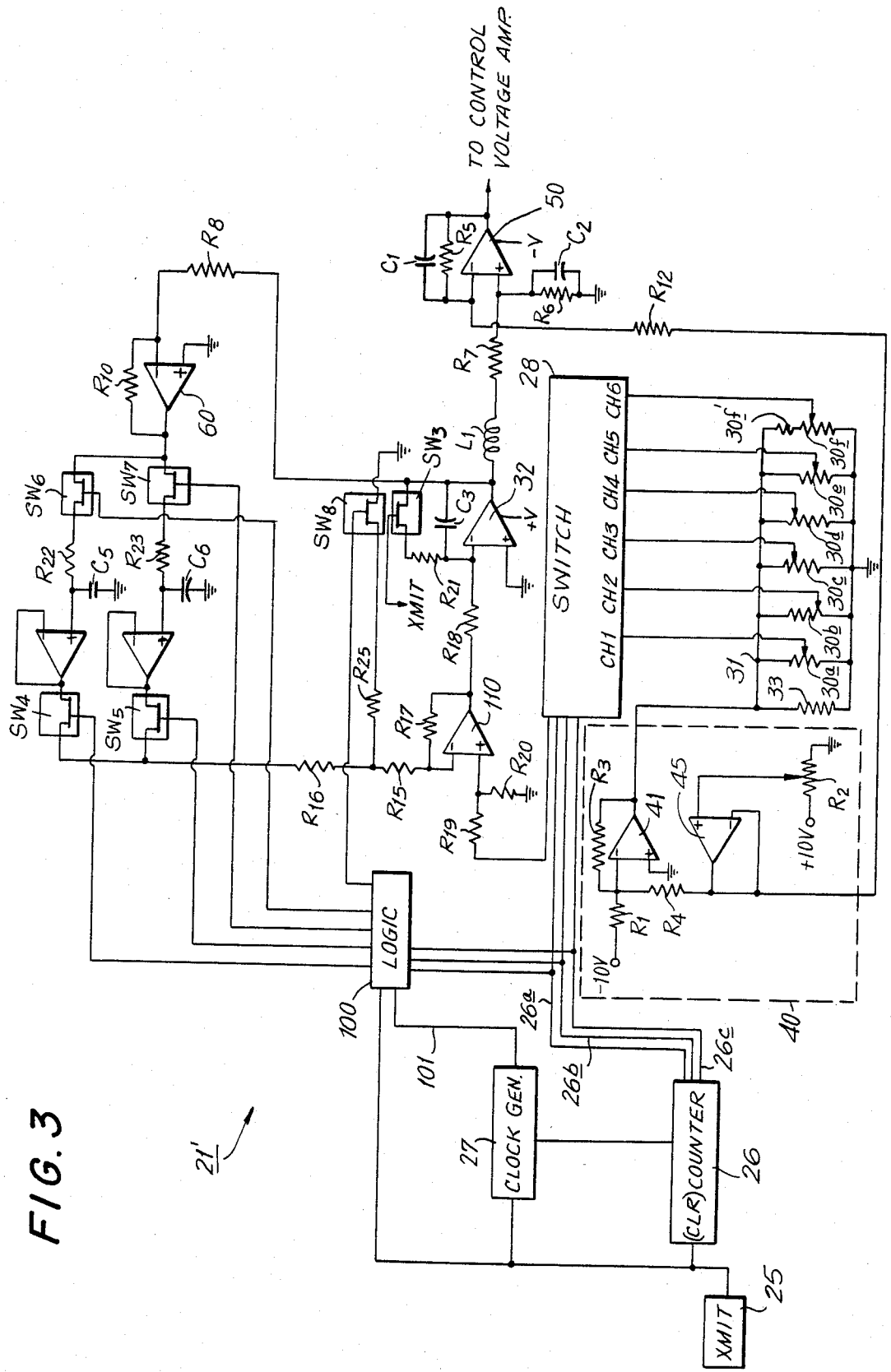
FIG. 3 is a schematic diagram, partially in block form, of a control voltage generator shown in FIG. 1 in accordance with an alternate embodiment of the present invention.

An alternative control voltage generator embodiment denoted by 21' is shown in FIG. 3 wherein like reference numerals refer to the same elements described in FIG. 2 and therefore require no further description. In contrast to FIG. 2, in FIG. 3 transmitter 25 is also connected to logic circuit 100 and to the gate of an FET designated as switch $SW_3$. $SW_3$ is connected at its drain to the output terminal of integrator 32 and at its source to a first end of resistor $R_{21}$. Logic circuit 100 is also connected to clock generator 27 along line 101 and to the gates of the FET's designated as switches $SW_4$, $SW_5$, $SW_6$, $SW_7$ and $SW_8$. Switch $SW_8$ is also connected at one end thereof to ground and at the other end thereof to a first end of resistor $R_{15}$ and a first end of resistor $R_{16}$ through a resistor $R_{25}$. The other end of resistor $R_{15}$ is connected to an inverting input terminal of a differential amplifier 110 and a first end of a resistor $R_{17}$. The other end of $R_{17}$ is connected to the output terminal of differential amplifier 110 and to a first end of resistor $R_{18}$. Connected to the noninverting input of differential amplifier 110 are first ends of resistors $R_{19}$ and $R_{20}$. The other ends of resistors $R_{19}$ and $R_{20}$ are connected to the output terminal of switch 28 and to ground, respectively. The other end of resistor $R_{18}$ is connected to the inverting input terminal of integrator 32, to one end of capacitor $C_3$ and to the other end of resistor $R_{21}$. The other end of resistor $R_{16}$ is connected to first ends of switches $SW_4$ and $SW_5$. The other ends of switches $SW_4$ and $SW_5$ are coupled through buffer amplifiers to first ends of capacitors $C_5$ and $C_6$ and to first ends of resistors $R_{22}$ and $R_{23}$, respectively. Second ends of capacitors $C_5$ and $C_6$ are grounded. First ends of switches $SW_6$ and $SW_7$ are connected to the second ends of resistors $R_{22}$ and $R_{23}$, respectively. The other ends of switches $SW_6$ and $SW_7$ are connected to the output terminal of inverter 60.

Operation of control voltage generator 21' is similar to control voltage generator 21 of FIG. 2 in that a high state of the enabling signal enables clock generator 27 which generates clock pulses counted by counter 26. Counter 26 produces binary output signals representative of the count value which are supplied to switch 28 for selectively switching one of the variable voltage sources 30a–30f in accordance with the count value. Variable voltage source 40 provides both a d.c. voltage to summing amplifier 50 and the voltage across the parallel network of adjustable voltage sources 30a–30f.

Prior to the first high state enabling signal produced by transmitter 25, the low state of the enabling signal clears binary counter 26 and disables clock generator 27. Switch $SW_3$ is also closed at this time and thereby discharges capacitor $C_3$ to zero volts. Additionally, switches $SW_4$ and $SW_8$ are open and switches $SW_5$, $SW_6$ and $SW_7$ are closed.

Upon the enabling signal assuming a high state, and with the value of counter 26 equal to one (1), logic circuit 100 maintains $SW_4$ and $SW_8$ in nonconductive states, opens switches $SW_5$ and $SW_6$ and maintains $SW_7$ in a closed state. Variable voltage source 30a is connected to differential amplifier 110 through resistor $R_9$. Switch $SW_3$ switches and remains in a nonconductive state as long as the enabling signal is in a high state. The output voltage of amplifier 110 is integrated by integrator 32 inasmuch as $SW_3$ is no longer shorting capacitor $C_3$. The output voltage of integrator 32 is supplied to summing amplifier 50 through inductor $L_1$ and resistor $R_7$. The output voltage of integrator 32 is also inverted by inverter 60 and stored across capacitor $C_6$. As the value of the count is incremented to two (2), assuming the enabling signal is still at a high state, logic circuit 100 turns switches $SW_5$ and $SW_6$ on, switches $SW_7$ into a nonconductive state and maintains switch $SW_4$ in an open state. Switch $SW_8$ is maintained in a nonconductive state. Accordingly, while the count value is two (2), that is, for 26 microseconds, the voltage across capacitor $C_6$ is applied to the inverting input terminal of differential amplifier 110 through resistors $R_{15}$ and $R_{16}$. Therefore, differential amplifier 110 will compare the level of variable voltage source 30b to the voltage supplied by capacitor $C_6$ and take the difference therebetween. Simultaneously, the output voltage of integrator 32, which is the integral of the difference between the level of voltage source 30b and the inverted output voltage of integrator 32 during the period that the count value was one (1), is inverted by inverter 60 and stored across capacitor $C_5$.

During the next 26 microseconds when the count value is three (3), logic circuit 100 supplies signals for closing switches $SW_4$ and $SW_7$ and for opening switches $SW_5$ and $SW_6$. Consequently, the output voltage of inverter 60 stored across capacitor $C_5$ is applied to the differential amplifier 110 through resistors $R_{15}$ and $R_{16}$ as is the voltage produced by variable voltage source 30c. At the same time, the output of integrator 32 is inverted by inverter 60 and stored across capacitor $C_6$. As can be now readily appreciated from the foregoing, capacitors $C_5$ and $C_6$ alterate in storing the last previous and present output signals of inverter 60 in response to switches $SW_4$ and $SW_7$ opening and closing together and switches $SW_5$ and $SW_6$ closing and opening together, respectively. The alternate storage by capacitors $C_5$ and $C_6$ of the output signal of inverter 60 continues while the enabling signal is in a high state.

When the value of the count reaches six (6), logic circuit 100 sends a signal along line 101 to disable clock generator 27. Consequently, counter 26 remains at a count value of six (6) until it is cleared in response to the enabling signal reverting to a low state. Preferably, once the count value reaches six (6), the enabling signal remains at a high state for about 130 microseconds before assuming a low state corresponding to an additional ten (10) centimeters of penetration by the ultrasonic pulses. During this 130 microsecond interval, adjustable voltage source $30f$ is connected to differential amplifier 110. As previously noted, the maximum voltage produced by summing amplifier 50 preferably does not exceed $-5$ volts. Consequently, the maximum output voltage produced by integrator 32 must be the same whether the time interval for integration is 26 microseconds or 130 microseconds. In view of the well known formula $CV = It$ as applied to integrator 32, where C is the value of the integrating capacitance, V is the value of voltage applied to the integrator, I is the value of current flowing into the integrator and t is the time period period during which integrator 32 operates, and inasmuch as the integrating capacitor $C_3$ is a constant and the maximum voltage at the end of a 26 microsecond interval or 130 microsecond interval is $-5$ volts, the product of CV is a constant. Accordingly, the product of It must be a constant. However, since t has been increased by a factor of five, the value of I flowing through $R_{18}$ must be decreased by a factor of five so that the product It remains a constant. Therefore, variable voltage source $30f$ which supplies the voltage along with capacitor $C_6$ to produce the current flowing through the integrator when the count value is 6 must be made equal to one fifth the value of the other adjustable voltage sources $30a-30e$. To accomplish this reduction in voltage, resistor $30f$ is connected in series with variable voltage source $30f$ and between node 31 and variable voltage source $30f$. Similarly, the voltage supplied by inverter 60 must be reduced to one fifth its value. Such reduction is accomplished by logic circuit 100 supplying a signal which closes switch $SW_8$ once the count value reaches six (6). Accordingly, resistor $R_{25}$ is connected between the node commonly shared by resistors $R_{15}$ and $R_{16}$ and switch $SW_8$ such that the voltage applied to the inverting input of differential amplifier 110 is one-fifth the value of the voltage across capacitor $C_6$.

Figure 4B:
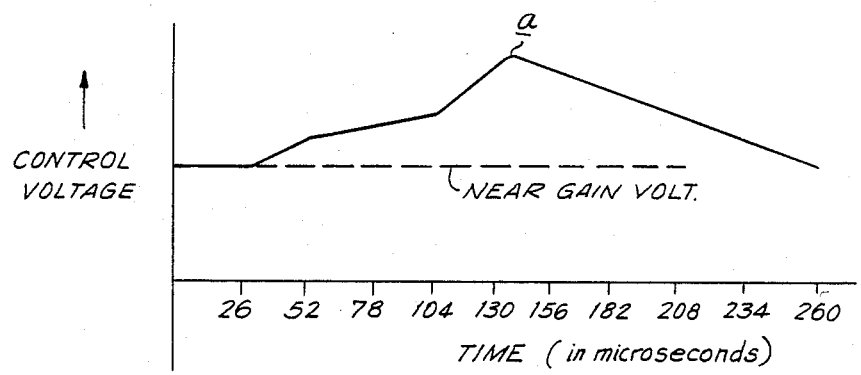

Referring now to FIG. 4B, a graphical representation for exemplary purposes of the control voltage produced in accordance with the embodiment of FIG. 3 is shown. In order to obtain a desired delay in the ramp voltage supplied to time-gain-controlled amplifier 20, variable voltage source $30a$ is adjusted to zero volts. Thus the control voltage equals the near gain voltage. The control voltage of FIG. 3 in contrast to FIG. 2, however, can assume a plurality of different curves by merely adjusting one or more of the variable voltage sources $30a-30f$ and/or resistor $R_2$ of variable voltage source 40. As particularly illustrated around area a on the curve, a rounded rather than a sharp peak is created by inductor $L_1$ and resistor $R_7$. More specifically, inductor $L_1$ and resistor $R_7$ filter out any sharp peaks on the curve which can appear as a very high frequency to the system. Therefore, sudden rises in the control voltage which would whiten out the screen on the CRT are avoided.

As can now be readily appreciated, the present invention provides a control voltage generator which automatically delays the time varying characteristic of the control voltage supplied to time gain control amplifier 20. Accordingly, the echo signals representative of the first several centimeters of penetration by the ultrasonic pulses will not be distorted on CRT 27 due to overcompensation by amplifier 20 as in the prior art. Having specifically described illustrative embodiments of the invention with reference to the accompanying drawings, it is to be understood that the invention is not limited to those precise embodiments and that various changes and modifications may be effected by one skilled in the art without departing from the scope and spirit of the invention as defined by the appended claims.

I claim:

1. For examining the interior of an object, an ultrasonic imaging device includes means for producing echo signals representative of the paths traveled within said object by corresponding ultrasonic waves which are generated by said device, amplifying means for amplifying said echo signals and control means for controlling the level of amplification provided by said amplifying means; said control means comprising:
   means for producing a plurality of input signals;
   first adjustable voltage means for producing a selected voltage level;
   integrating means for operating on said input signals and producing integrated signal levels of a particular polarity;
   inverting means for reversing the polarity of said integrated signal levels and producing inverted signal levels; and
   summing means for adding said selected voltage of said first adjustable voltage means and said integrated signal levels and responsive to said inverted signal levels for producing control signals said amplifying means amplifying said echo signals in response to said control signals.

2. An ultrasonic imaging device as in claim 1; wherein said device further comprises at least one electro-acoustic element for transmitting and receiving said ultrasonic waves and producing said echo signals and wherein said level of amplification varies as a function of time.

3. An ultrasonic imaging device as in claim 2; wherein said control means further comprise generating means for producing an enabling signal having high and low states; said generating means producing a high state enabling signal simultaneously with the transmission of an ultrasonic wave by said at least one electro-acoustic element.

4. An ultrasonic imaging device as in claim 3; wherein said control means further comprise clocking means for generating a plurality of clock signals in response to said high state of said enabling signal and counting means for producing a plurality of count values representative of the distance traveled within said object by said ultrasonic waves in response to said plurality of clock signals.

5. An ultrasonic imaging device as in claim 4; wherein said count value is zero in response to said generating means producing an enabling signal at a low state.

6. An ultrasonic imaging device as in claim 4; wherein said means for producing a plurality of input signals further comprise a plurality of second adjustable voltage means and first switching means for selecting one of said plurality of second adjustable voltage means in response to the value of said count.

7. An ultrasonic imaging device as in claim 6; wherein each second adjustable voltage means has a voltage range controlled by said first adjustable voltage means.

8. An ultrasonic imaging device as in claim 7; wherein said summing means adds said inverted signal levels for a first predetermined period of time in producing said control signals.

9. An ultrasonic imaging device as in claim 8; wherein said means for producing input signals is said first switching means.

10. An ultrasonic imaging device as in claim 9; wherein said control means further comprises sample and hold means for sampling one of said inverted signal levels and holding the same for a second predetermined period of time.

11. An ultrasonic imaging device as in claim 10; wherein said control means further comprise logic means for determining completion of said first predetermined period of time and producing a logic signal in response to said high state of said enabling signal.

12. An ultrasonic imaging device as in claim 11; wherein said control means further comprise second switching means for inhibiting addition of said inverted signal levels by said summing means in response to said logic signal; said summing means adding said held signal level of said sample and hold means upon said second switching means inhibiting the addition of said inverted signal levels.

13. An ultrasonic imaging device as in claim 12; further comprising shorting means for disabling production of said integrated signal levels after said second predetermined time period.

14. An ultrasonic imaging device as in claim 13; wherein said integrating means, inverting means and summing means comprise operational amplifiers and wherein said logic means comprise three multivibrators and an R-S flip-flop having a set input for receiving said enabling signal.

15. An ultrasonic device as in claim 14; wherein said first adjustable voltage means comprise a differential amplifier, a buffer amplifier, two voltage sources of equal magnitude and opposite polarity, and a variable resistor; and wherein said plurality of second adjustable voltage means comprise six variable resistors connected in parallel with each other and connected to the output of said differential amplifier of said first adjustable voltage means.

16. An ultrasonic imaging device as in claim 7; wherein said integrating means produces a present integrated signal level in accordance with a last previous inverted signal level.

17. An ultrasonic imaging device as in claim 16; wherein said means for producing said plurality of input signals further comprises a differential amplifier having an inverting and a noninverting input terminal.

18. An ultrasonic imaging device as in claim 17; wherein said control means further comprise storage means for storing the last previous and the present inverted signal levels and second switching means for selecting the last previous inverted signal level for supply to said inverting input terminal of said differential amplifier.

19. An ultrasonic imaging device as in claim 18; wherein said storage means comprise a pair of capacitive elements; and wherein said second switching means comprise two pairs of field effect transistors, each pair of field effect transistors being switched to their conductive and nonconductive states simultaneously such that each capacitive element switches between storing the last previous and present inverted signal levels.

20. An ultrasonic imaging device as in claim 18; further comprising shorting means for disabling production of said integrated signal levels in response to the state of said enabling signal.

21. An ultrasonic imaging device as in claim 20; wherein said shorting means comprise a field effect transistor.

22. An ultrasonic imaging device as in claim 20; wherein said control means further comprise logic means responsive to the value of said count for controlling selection by said second switching means, initiating operation of said shorting means, and disabling generation of all clock signals by said clocking means.

23. An ultrasonic imaging device as in claim 22; wherein said noninverting input terminal of said differential amplifier is connected by said first switching means to the selected one of said plurality of second adjustable voltage means.

24. An ultrasonic imaging device as in claim 23; wherein said control means further comprise means for reducing the level of the last previous inverted signal level supplied to the inverting input terminal of said differential amplifier in response the value of the count of said counting means.

25. An ultrasonic imaging device as in claim 24; wherein said integrating means, inverting means and summing means comprise operational amplifiers.

26. An ultrasonic imaging device as in claim 23; wherein said first adjustable voltage means comprise a differential amplifier, a buffer amplifier, two voltage sources of equal magnitude and opposite polarity, and a variable resistor; and wherein said plurality of second adjustable voltage means comprise six variable resistors connected in parallel with each other and connected to the output of said differential amplifier of said first adjustable voltage means.

* * * * *